(12) United States Patent
Shulman et al.

(10) Patent No.: US 7,907,150 B2
(45) Date of Patent: Mar. 15, 2011

(54) METHOD OF FUSION OR MERGING IMAGERY DATA FOR IMPROVED VISUAL PERCEPTION USING MONOSCOPIC AND STEREOGRAPHIC FUSION AND RETINAL DECAY TECHNIQUES

(75) Inventors: Alan Shulman, Santa Rosa, CA (US); Donald R. Snyder, III, Crestview, FL (US)

(73) Assignee: Doubleshot, Inc., Rohnert Park, CA (US)

( * ) Notice: Subject to any disclaimer, the term of this patent is extended or adjusted under 35 U.S.C. 154(b) by 1390 days.

(21) Appl. No.: 10/914,376

(22) Filed: Aug. 9, 2004

(65) Prior Publication Data

US 2005/0128584 A1 Jun. 16, 2005

Related U.S. Application Data

(60) Provisional application No. 60/493,578, filed on Aug. 9, 2003.

(51) Int. Cl.
*G09G 5/00* (2006.01)
*H04N 15/00* (2006.01)

(52) U.S. Cl. .............. 345/629; 348/42; 348/60; 345/9

(58) Field of Classification Search .......... 345/419, 345/629, 9; 362/459; 348/42–60
See application file for complete search history.

(56) References Cited

U.S. PATENT DOCUMENTS

| | | | | |
|---|---|---|---|---|
| 4,792,850 A | * | 12/1988 | Liptoh et al. | 348/57 |
| 4,843,460 A | * | 6/1989 | Le Guet et al. | 348/139 |
| 5,416,510 A | * | 5/1995 | Lipton et al. | 348/43 |
| 5,726,703 A | * | 3/1998 | Izawa et al. | 348/46 |
| 5,930,037 A | * | 7/1999 | Imai | 348/59 |
| 6,023,277 A | * | 2/2000 | Osaka et al. | 345/419 |
| 6,111,582 A | * | 8/2000 | Jenkins | 345/421 |
| 6,163,336 A | * | 12/2000 | Richards | 348/42 |
| 6,532,008 B1 | * | 3/2003 | Guralnick | 345/419 |
| 6,853,357 B2 | * | 2/2005 | Inoue et al. | 345/9 |
| 2002/0122113 A1 | * | 9/2002 | Foote | 348/48 |
| 2003/0048354 A1 | * | 3/2003 | Takemoto et al. | 348/42 |
| 2005/0057580 A1 | * | 3/2005 | Yamano et al. | 345/690 |
| 2007/0146251 A1 | * | 6/2007 | Tsuge et al. | 345/76 |

* cited by examiner

*Primary Examiner* — Chante Harrison
(74) *Attorney, Agent, or Firm* — Finnegan, Henderson, Farabow, Garrett & Dunner, LLP

(57) ABSTRACT

A method of presenting multiple image sources of approximately registered images so that the mind can easily fuse the multiple images into one image. Improvement to fusing can be achieved by alternating views between sources at 85 hertz or more. The insertion of a black frame between the succession of frames optimizes the neurological functions of the human optical system (produces retinal decay) such that the perception of a useful fused image is greatly enhanced. Stereographic fusion can also be achieved to allow for fusion of loosely registered datasets.

13 Claims, 4 Drawing Sheets

Figure 3M Monoscopic
Sequences at > 85 hertz progressive
A) Frame 1　　2　　3　　4
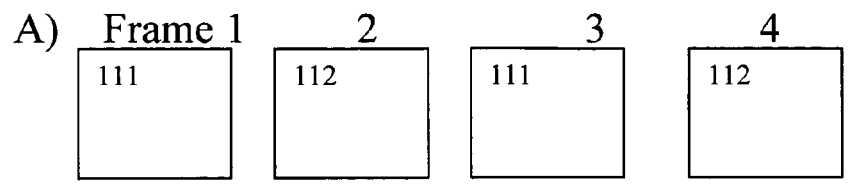
B) Insertion of Black
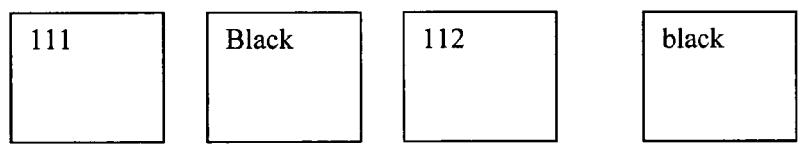
c) Multiple cameras

| time | Left Eye | Right Eye | Frame reference |
|---|---|---|---|
| 0 | Source 111 | Black | 1 |
| 12.5 msec | black | Source 112 | 1 |
| 25 msec | Source 111 | black | 2 |
| 37.5 msec | black | Source 112 | 2 |

Figure 3 S Stereo

| time | Left Eye | Right Eye | Frame reference |
|---|---|---|---|
| 0 | Source 111 | Black | 1 |
| 12.5 msec | black | Source 112 | 2 |
| 25 msec | Source 111 | black | 3 |
| 37.5 msec | black | Source 112 | 4 |

Figure 4 S

| time | Left Eye | Right Eye | Frame reference |
|---|---|---|---|
| 0 | Source 111 | Black | 1-3 |
| 12.5 msec | black | Source 112 | 4-6 |
| 25 msec | Source 111 | black | 7-9 |
| 37.5 msec | black | Source 112 | 9-12 |

Figure 5 S

| time | Left Eye | Right Eye | Frame reference |
|---|---|---|---|
| 0 | Source 111 | Black | 1 |
| 8 msec | black | Source 112 | 2 |
| 16 msec | Source 111 | black | 3 |
| 24 msec | black | Source 112 | 4 |

Figure 6 S

METHOD OF FUSION OR MERGING IMAGERY DATA FOR IMPROVED VISUAL PERCEPTION USING MONOSCOPIC AND STEREOGRAPHIC FUSION AND RETINAL DECAY TECHNIQUES

RELATED APPLICATIONS

The present application is based upon a provisional application Ser. No. 60/493,578 filed on Aug. 9, 2003.

TECHNICAL FIELD

The present invention relates to methods of enhancing the perception of images derived from multiple image sensors.

BACKGROUND OF THE INVENTION

As a range of imaging sources and related technology are available to probe or detects features and details of objects not generally visible to the naked eye there is great incentive to combine such information in a single visual image. However, prior methods of merging images from multiples sensors to form such composite images for visual observation have been dependent upon proper registration between corresponding real world points in each image. Combining images from different sources also combines noise such that otherwise distinct features in one image are less visible, or not readily correlated with reference features in the other image. Stereographic techniques involve the accurate placement and alignment (convergence) of cameras. Unfortunately, many issues can create non-convergable datasets that produce headache. Traditionally, it was thought that identical cameras would be required to achieve fusion. This technique allows for fusion from dissimilar kinds of cameras, fields of view with much greater convergence ranges.

It is therefore a first object of the present invention to provide an improved method of combining and presenting to the viewer images that exploits the forgiving properties of accommodation, resizing and rescaling capabilities of human monocular and stereoscopic vision, enabling facile fusion of diverse images to reveal otherwise hidden features, eliminate noise sources and avoid eye strain and fatigue.

It is yet another object of the invention to fuse multiple images to produce stereoscopic representations of the images that have good contrast and spatial depth perception.

It is another object of this invention to use black between alternating frames that allow the time for retinal decay to occur to achieve fusion with multiple images that are only approximately registered.

SUMMARY OF THE INVENTION

An object of the present invention achieved by the monoscopic and or stereoscopic display of visual images combined from multiple sources (2 or more) by alternating the exposure of each source image and inserting a null image or black frame between each image frame. This can be done stereoscopically by alternating the eyes and black so that only one view is seen at a time. This can also be done monoscopically by alternating black between a succession of multiple images with that are only approximately registered.

Another objective of the invention is achieved by presenting a first image frame from a first source to the right eye while a null image or black frame is presented to the left eye. This is followed by presenting either a first or sequential image frame of second image source to the left eye source while the null image or black frame is presented to the right eye, with the sequence repeating to achieve retinal decay.

Another objective of the invention is achieved by using a stereoscopic display to fuse images from 2 or more non-registered datasets that are loosely registered, but from vastly different image sources. In this instance, insertion of black is not required, but would improve the results.

Another objective of the invention is achieved by presenting the alternative sources at frame rate of at least about 80 Hz.

The above and other objects, effects, features, and advantages of the present invention will become more apparent from the following description of the embodiments thereof taken in conjunction with the accompanying drawings.

BRIEF DESCRIPTION OF THE FIGURES

FIGS. 3 through 6 are schematic timing charts illustrating a variety of alternative embodiments of the operative principles of image processor P in FIG. 1 for presenting sequential frame of the imaging data in a manner that enables visual fusion by the viewer.

DETAILED DESCRIPTION OF THE INVENTION

Figure 1:
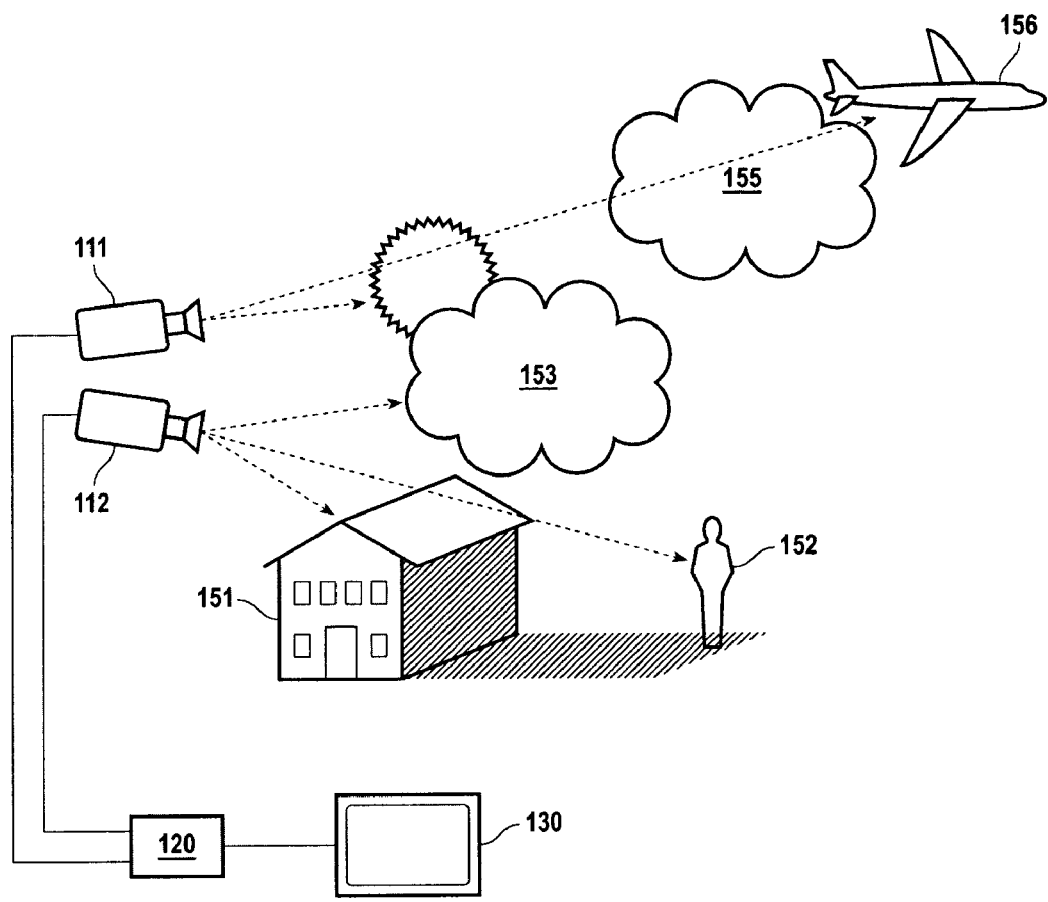
FIG. 1 is a schematic diagram showing an image collection and display system according to the teachings of the instant invention.

In accordance with the present invention FIG. 1 is a schematic illustration of an image acquisition and display system 100 according to the teachings of the instant invention. Image acquisition cameras 111 and 112 are directed at a common an area of interest, represented by the icon collection 150. At least one of image acquisition cameras can include a non-visual sensor for creating an electronic image that has the potential to reveal objects that would not be visually observed, for example a thermal or infrared imaging camera for detecting people or vehicles at night or obscured by fog, etc. The electronic signals corresponding to time sequential images or image frame are conveyed via circuits 115 and 116 to image display control unit 120. Image display control unit 120 comprises an amplifier (A) and an image processor (P). The processor combines and transmits the image frames from cameras 111 and 112 to display monitor 130 according to the methods taught herein. This includes:

1. Alternating between cameras 111, 112 or more in sequence at switching rates greater that 85 hertz;
2. Insertion of black between the sequence of frames;
3. Use of stereo displays to converge and fuse two non-congruent cameras such as thermal and video. These can be autostereo, anaglyph, shutter glasses, HUD, HMD, projection or other stereoscopic display technique;
4. Stereoscopic techniques to provide for one eye seeing an image while the other eye sees a null frame of black and switching the signals with at least 85 Hertz;
5. Use of the any combination of categories of images such as video, film, sonar, raster images, thermal, multi-spectral, black and white, color or other visual sensor and raster image. Displays can be monoscopic or stereoscopic.

In another embodiment, the display monitor also includes head mounted goggles where each eye is exposed to a different individual image display monitor for stereoscopic viewing. As will be further explained, such stereoscopic viewing can also be implemented on a single monitor with a sufficiently high refresh or display rate. Alternatively, multiple frames can be displayed wherein the viewer uses a binocular stereoscopic optic system to combine images. Thus, display monitor is used herein to denote the display system component for producing the final visual image detected by the user.

Figure 2:
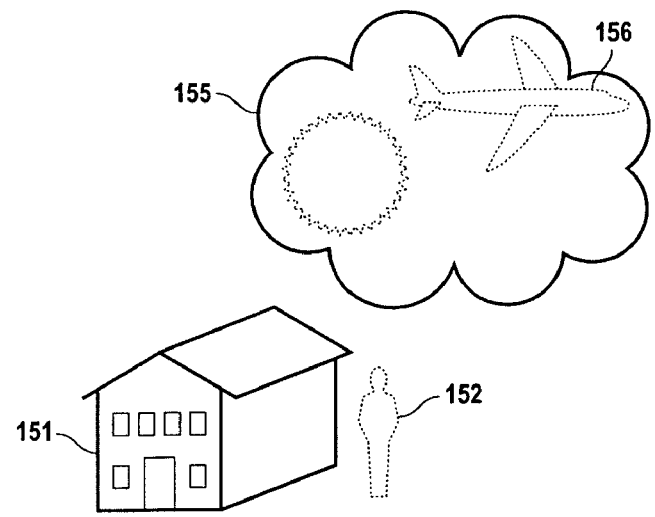
FIG. 2 a schematic diagram showing the desired fusion image as perceived by the viewer.

FIG. 1 illustrates the use of multiple imaging systems to produce the single image in FIG. 2, representing the desired perception of the image by the viewer who could not perceive the same image if located in the position of the image acquisition cameras. In FIG. 1 dashed lines represent the icons that are detected, that is images by the respective cameras. Assuming for purposes of illustration that camera 112 is an ordinary video imaging camera it images house 151, but not person 152 who could be obscured by rain or fog, or be in the deep shadow of house 151. Further, while camera 112 would perceive clouds 153 or 155 it may not detect airplane 156 flying within the clouds. When camera 111 is an infrared or thermal imaging camera, i.e. it detects and images the sources of incident infrared energy at one or more wavelengths the visual form of display is translated to a grey or color scale to display a relative difference in infrared emission between object. Thus those objects significantly warmer than the background, specifically sun 154, person 152 and at least part of airplane 156, and possibly some cloud structures can be made to appear distinct from the background regions in the optimum visual display transformation. Thus an ideal combined image would appear similar to FIG. 2, in which object imaged by both detectors are displayed to the viewer. However, since the both images provide some contrast from the same objects it is important that these images appropriately overlap to aid, rather than hinder the viewer's perception and the relative positions of the visible and non-visible objects, to accurately perceive within cloud 155 the position of airplane 156. The ability to present the viewer with multiple image sensor frames so they can be perceived without confusion and correct spatial juxtaposition is termed image fusion.

Not wishing to be bound by theory, it has been discovered that image fusion is greatly enhanced by avoiding the over stimulation of the non-attentive neurological functions of the human optical system. Specifically, the multiple images can be properly fused when presented at an appropriate frame rate and by providing a black field between the presentations of the different sources. This is preferably accomplished by alternating the presentation of a different source to each eye while the other eye is presented with the black field.

FIG. 3 M (monoscopic) describes several sequences for monoscopic fusion:
 a) alternating between cameras 111, 112 (or more) at frequencies higher than 85 hertz;
 b) insertion of black between frames;
 c) multiple cameras 111,112,113 or more.

FIG. 3 S (stereoscopic) illustrates the operative principles of image processor P for the time-sequenced presentation of images from cameras 111 and 112 on a frame-by-frame basis that enables fusion according to the aforementioned principles. Each row in the table sets forth the image frames presented to the right and left for the elapsed time between successive rows as denoted in the first column. Thus, for the first 12.5 msec. the left eye is exposed to the first frame from camera 111, while the right eye is exposed to a null or black image. For the second 12.5 msec. increment, that is 12.5 to 25 msec., the right eye is exposed to the first frame from camera 112, while the left eye is exposed to a null or black image. The same sequence repeats for the second frame acquired by camera 111 and 112, such that (1) from 25 to 37.5 the left eye is exposed to the second frame from camera 111, while the right eye is exposed to a null or black image; and (2) from 37.5 to 50 msec. the right eye is exposed to the first frame from camera 112, while the left eye is exposed to a null or black image.

It should be appreciated that the processor operating in accordance with the timing diagram of FIG. 3 preferably has the capability to store image frames and modify the display refresh rate of analog or digital camera sources as to display the respective images as set forth in FIG. 3. As the more preferred rate of presenting null or black frames is greater than about 100 Hz, and most preferably greater than about 120 Hz. it is also desirable that the image processor has a variable rate of black frame insertion to accommodate this range. However, to the extent each eye is exposed to a separate distinct monitor, the processor need not store images, but simply redisplay the images at the ordinary transmission rate, that is the rate designed for the camera, while the processor or other device inserts null or blank images in between alternating views at the preferred rate. As shown in FIG. 4, if image frames are acquired at 80 Hz. they can be displayed at the same rate so that an image frame need not be stored in a buffer, as the frames are never repeated, the change in image content should be negligible. Alternatively, as shown in FIG. 5, if the camera acquisition rate is higher than the rate at which black frames are inserted, then multiple image frames can be presented to one eye in sequence. Another alternative, shown in FIG. 6, is to increase the rate at which blank frames are inserted, for examples to 120 Hz, in synchronization with the video acquisition rate.

Figure 7:
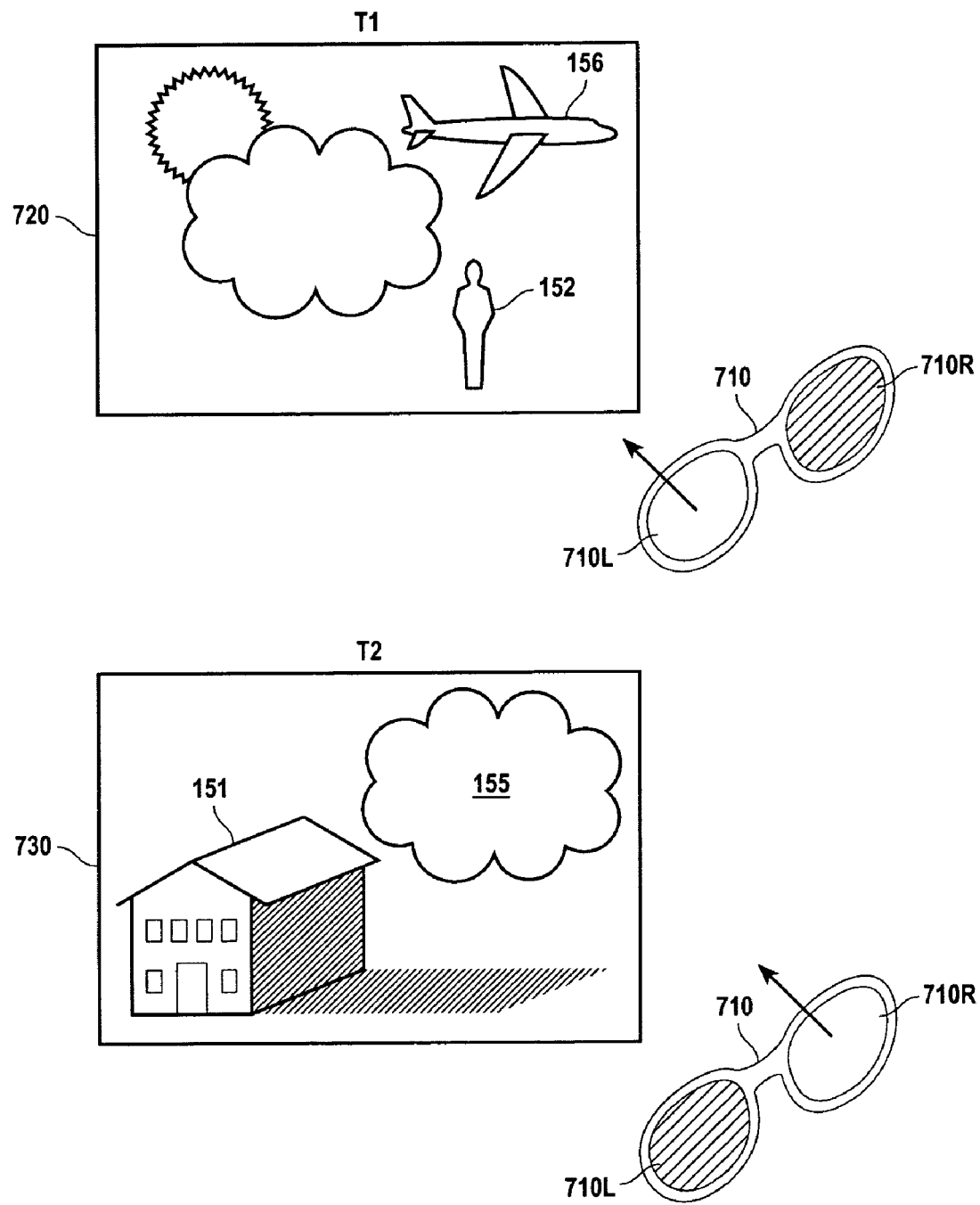
FIG. 7 is a schematic diagram illustrating one embodiment for implementing the timing diagrams of FIG. 3 to 6 with a single monitor and stereoscopic display.

FIG. 7 illustrates a preferred embodiment of applying the teachings of FIGS. 4 to 6 for stereoscopic viewing from a single monitor. The user wears optical shutter glasses 710. The use and function of optical shutter glasses for stereoscopic or 3-dimensional viewing are further described in U.S. Pat. Nos. 4,884,876 and 5,510,832, which are incorporated herein by reference. Optical shutters 710R and 710L alternate between opaque and transparent states but 180 degrees out of phase. Briefly, during time frame T1, the right eye is presented with a dark field as shutter 710R closes, that is, transforms from transparent to opaque, in synchronization with monitor 720 displaying the image from camera 111, which is now visible only to the left eye. During the subsequent time frame, T2, the left eye is presented with a dark field as shutter 710L closes, that is, transforms from transparent to opaque, in synchronization with monitor 720 displaying the image from camera 112, which is now visible only to the right eye. Accordingly, the viewer will now perceive the imaging sources as a combined three dimensional view as the insertion of the null or black frame after the presentation of each source apparently facilitates the natural processes of depth perception inherent in the pre-attentive phase of human vision but without limitations encountered in the prior art.

Further, the image acquisition cameras need overlap to image the same field for registration of a fused image. Image acquisition cameras are preferably separated to increase the stereographic projection of the overlapping viewing fields. As an alternative, one camera might view people above the horizon to observe non-visual information at a particular wavelength, where another camera having a different wavelength range of sensitivity views below the horizon such that the fusion of adjacent fields creates a normal or full field view in which the viewer can correlate objects in the sky with ground positions. Alternatively, the multiple images can be created from a 3-dimension or stereoscopic image. In these other applications at least one of the image sources is a synthetic image created from electro-magnetic, mechanical or thermal transducers, such as radar, sonar, x-ray, ultrasound, NMR, PET systems and the like. While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A method of displaying multiple source images via a display monitor device to first and second eyes of a viewer for fusion into a single useful image, the method comprising:
   a) acquiring a first image from a first imaging source associated with a first viewing field;
   b) acquiring a second image from a second imaging source associated with a second viewing field that overlaps or is adjacent to the first viewing field; and
   c) alternating, on the display monitor device, a visual display of the first image with a first black field and the second image with a second black field sequentially,
   wherein durations of the visual displays of the first and the second images, and durations of the visual displays of the first and the second black fields are selected based on durations of retinal decays in the first and second eyes, to achieve fusion of the first and second images.

2. The method of claim 1 wherein the first eye is presented with a frame of the first image while the second eye is presented with the second black field, alternating with the second eye being presented with a frame of the second image while the first eye is presented with the first black field, such that each eye alternatively views the first or the second imaging source and the first or the second black field.

3. The method of claim 1 wherein one of the imaging sources is a non-visual imaging source.

4. The method of claim 3 wherein said non-visual imaging source comprises a thermal camera.

5. The method of claim 3 where said non-visual imaging source comprises an infrared camera.

6. The method of claim 3 wherein said non-visual imaging source comprises a sonar source.

7. The method of claim 1 wherein said first black field or second black field comprises a null image.

8. The method of claim 1 wherein said first black field or second black field comprises a black frame.

9. The method of claim 1 wherein said alternating visual displays of the first and second images is carried out at a frame rate of at least approximately 80 Hz.

10. The method of claim 1, wherein the first eye and the second eye are both presented with a frame of the first image followed by the first black field followed by a frame of the second image.

11. The method of claim 1, further comprising acquiring a third image from a third imaging source, and alternating the visual display of the third image with a third black field to each first and second eye sequentially.

12. The method of claim 1, wherein the viewer views the display monitor device without using a selection device.

13. A method of displaying multiple source images via a display monitor device to first and second eyes of a viewer for fusion into a single useful image, the method comprising:
   a) acquiring a first image from a first imaging source associated with a first viewing field;
   b) acquiring a second image from a second imaging source associated with a second viewing field that overlaps or is adjacent to the first viewing field; and
   c) alternating a visual display of the first image with a first black field and the second image with a second black field sequentially,
   wherein durations of the visual displays of the first and the second images, and durations of the visual displays of the first and the second black fields are selected based on durations of retinal decays in the first and second eyes, to achieve fusion of the first and second images.

* * * * *